United States Patent
Cohen et al.

(10) Patent No.: US 12,244,665 B1
(45) Date of Patent: Mar. 4, 2025

(54) SYSTEM AND METHOD FOR DATA CENTER ROUTING

(71) Applicant: NICE LTD., Ra'anana (IL)

(72) Inventors: Yaron Cohen, Modiin (IL); Nikolai Shaidulin, Netanya (IL); Eduard Grinberg, Raanana (IL)

(73) Assignee: NICE LTD., Ra'anana (IL)

( * ) Notice: Subject to any disclaimer, the term of this patent is extended or adjusted under 35 U.S.C. 154(b) by 25 days.

(21) Appl. No.: 18/471,675

(22) Filed: Sep. 21, 2023

(51) Int. Cl.
*H04L 12/24* (2006.01)
*H04L 67/1008* (2022.01)
*H04L 67/101* (2022.01)
*H04L 67/1023* (2022.01)

(52) U.S. Cl.
CPC ........ *H04L 67/1008* (2013.01); *H04L 67/101* (2013.01); *H04L 67/1023* (2013.01)

(58) Field of Classification Search
None
See application file for complete search history.

(56) References Cited

U.S. PATENT DOCUMENTS

| | | | |
|---|---|---|---|
| 2016/0269319 A1* | 9/2016 | Wise | H04L 67/51 |
| 2020/0349272 A1* | 11/2020 | Werneke | G06F 9/4881 |
| 2021/0124613 A1* | 4/2021 | Goodwin | G06F 9/5077 |

FOREIGN PATENT DOCUMENTS

| | | | | |
|---|---|---|---|---|
| CA | 2824330 A1 * | 7/2012 | ........... | G01S 3/7864 |

* cited by examiner

*Primary Examiner* — Natisha D Cox
(74) *Attorney, Agent, or Firm* — PEARL COHEN ZEDEK LATZER BARATZ LLP

(57) ABSTRACT

A system and a method of managing data transfer for a plurality of data centers may include identifying data transfer capacity and data transfer demand for each server of a plurality of data centers; calculating a data transfer distribution for the plurality of data centers that prioritizes data transfer between servers of a first data center of the plurality of data centers over data transfer between servers of the first data center and servers of the remaining data centers of the plurality of data centers based on the identified data transfer capacity and the data transfer demand; and allocating data transfers to the servers of the plurality of data centers.

20 Claims, 8 Drawing Sheets

400

402 — IDENTIFYING DATA TRANSFER CAPACITY AND DATA TRANSFER DEMAND FOR EACH SERVER OF A PLURALITY OF DATA CENTERS

404 — CALCULATING A DATA TRANSFER DISTRIBUTION FOR THE PLURALITY OF DATA CENTERS THAT PRIORITIZES DATA TRANSFER BETWEEN SERVERS OF A FIRST DATA CENTER OF THE PLURALITY OF DATA CENTERS OVER DATA TRANSFER BETWEEN SERVERS OF THE FIRST DATA CENTER AND SERVERS OF THE REMAINING DATA CENTERS OF THE PLURALITY OF DATA CENTERS BASED ON THE IDENTIFIED DATA TRANSFER CAPACITY AND THE DATA TRANSFER DEMAND

406 — ALLOCATING DATA TRANSFERS TO THE SERVERS OF THE PLURALITY OF DATA CENTERS

FIG. 4

SYSTEM AND METHOD FOR DATA CENTER ROUTING

TECHNICAL FIELD OF THE INVENTION

The present invention relates generally to the distribution of data, more specifically to the distribution of data between data centers.

BACKGROUND OF THE INVENTION

Cloud computing relies on the provision of data via data centers that are located around the world and allows users of a cloud computing provider to access data files using various devices and/or to share data across devices of multiple users.

Cloud regions may include a plurality of data centers, also referred to as availability zones of a cloud region.

Data transfer may proceed within a single availability zone, for example between two servers of a data center. However, data may also be transferred between servers of different data centers, e.g. between two or more availability zones.

Data transfer between two servers that are connected to a single data center is usually free of charge. However, data transfer between servers of different data centers may require the payment of a fee depending on the required data volume. On average, the charge for a data transfer between different availability zones may be around $0.01/gigabyte.

For computer telephony integration (CTI) events, the amount of data volume that may be transferred between data centers to transmit controlling and signaling events may be low, leading to low costs in the data transfer between data centers. However, data transfer between data centers to transfer media data, e.g. audio or video telephony data may require the transfer of large amounts of data between data centers.

Thus, there is a need for a solution that allows minimizing the amount of data that is transferred between servers of different data centers.

SUMMARY OF THE INVENTION

Improvements and advantages of embodiments of the invention may include automatically calculating data transfer between data centers and dynamically adapting data transfer between data centers in response to server issues, e.g. a failure or partial failure in the operational state of a data center.

Minimizing data transfer between the plurality of data centers and favoring data transfer within a single data center may allow reducing costs that occur in the transfer of data between a plurality of data centers.

One embodiment may include a method of managing data transfer for a plurality of data centers, the method comprising: identifying data transfer capacity and data transfer demand for each server of a plurality of data centers; calculating a data transfer distribution for the plurality of data centers that prioritizes data transfer between servers of a first data center of the plurality of data centers over data transfer between servers of the first data center and servers of the remaining data centers of the plurality of data centers based on the identified data transfer capacity and the data transfer demand; and allocating data transfers to the servers of the plurality of data centers.

In one embodiment, data transfer between the plurality of data centers is minimized.

In one embodiment, the availability of the plurality of data centers or of the servers thereof for data transfers is checked.

In one embodiment, calculating the data transfer distribution includes maintaining a buffer capacity of data transfer capacity for each server of the plurality of data centers.

In one embodiment, the buffer capacity includes at least 50% of the data transfer capacity for each server.

In one embodiment, data transfers are allocated to the servers of the remaining data centers when the data transfer capacity for the servers of the first data center is lower than the data transfer demand for the servers of the first data center.

In one embodiment, the data transfers that are allocated to the servers of the remaining data centers are substantially evenly distributed between the servers of the remaining data centers.

In one embodiment, the management of the data transfers proceeds in real time.

In one embodiment, minimizing data transfer between the plurality of data centers includes limiting data transfer to data transfer between servers of the first data center and no data transfer between the plurality of data centers.

In one embodiment, the plurality of data centers consists of two data centers.

One embodiment may include a system for managing data transfer for a plurality of data centers, the system comprising: a memory; and a processor, the processor configured to: identify data transfer capacity and data transfer demand for each server of a plurality of data centers; calculate a data transfer distribution for the plurality of data centers that prioritizes data transfer between servers of a first data center of the plurality of data centers over data transfer between servers of the first data center and servers of the remaining data centers of the plurality of data centers based on the identified data transfer capacity and the data transfer demand; and allocate data transfers to the servers of the plurality of data centers.

One embodiment may include a method of managing the distribution of data for a plurality of data centers, the method comprising: identifying capacity and demand for data transfers for each node of two or more data centers; determining an allocation of data transfers for the two or more data centers that prioritizes data transfers between nodes of a first data center of the two or more data centers over data transfers between the nodes of the first data center and nodes of remaining data centers of the two or more data centers based on the identified capacity and demand for data transfer; and setting data transfers to the nodes of the two or more data centers.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 depicts a flowchart of methods of managing data transfer for a plurality of data centers, according to some embodiments of the present invention.

Figure 1:
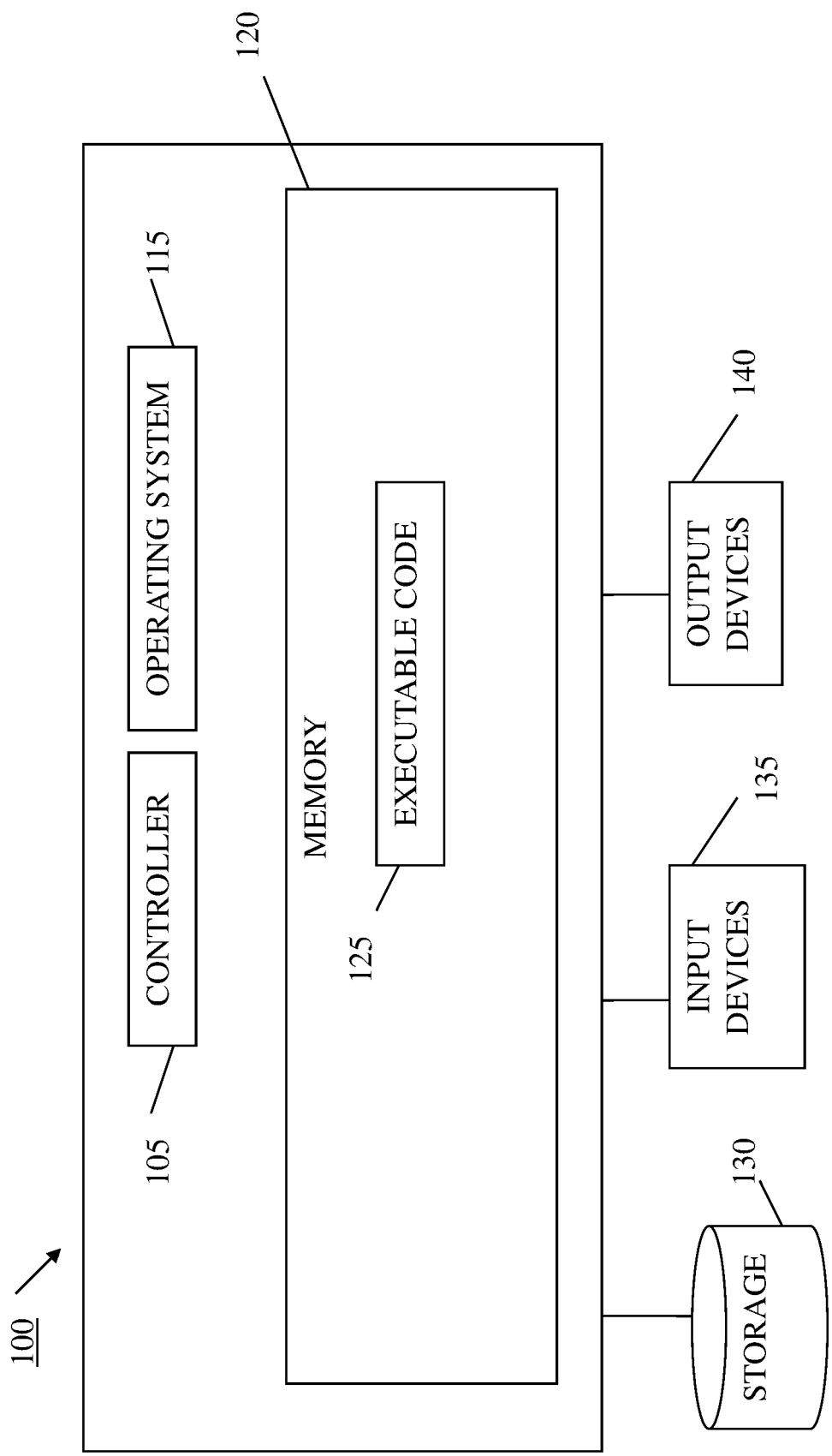
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, a "data center" or sometimes referred to as "availability zone" may be part of a cloud-based data service that includes a plurality of data centers. They may provide data storage, e.g. to store or retrieve data, or processor capacity, e.g. to execute software applications for clients, e.g. a user of a cloud service. Data centers may be accessed by a software application e.g. a client, executed by a computing device via a network, e.g. the Internet. Data centers may be located in different territorial regions, for example a plurality of data centers may be located in several different places within a state, a country or data centers may be located on different continents. The decentralized locations of data centers may ensure that clients can access data or a service executed by a data cloud service, for example, in the event a data center develops a fault. Thus, decentralized locations of data centers may reduce the risk that a service becomes unavailable, e.g. as a result of a data center being affected by a natural disaster that may affect a data center in a specific region. Clients can operate applications and access data storage on multiple data centers at the same time and can transfer data between different data centers.

As used herein, "interaction" may refer to a communication between two or more people (e.g., in the context of a contact center, an agent and a customer), and may include, for example, voice telephone calls, conference calls, video recordings, face-to-face interactions (e.g., as recorded by a microphone or video camera), emails, web chats, SMS messages, etc. An interaction may be recorded and may be stored on a server, e.g. a server of a data center such as data centers 210 or 250. An interaction may also refer to the data which is transferred and stored on a server of a computer system recording the interaction such as a server of a data center, the data representing the interaction, including for example voice or video recordings, data items describing the interaction or the parties, a text-based transcript of the interaction, etc. Interactions as described herein may be "computer-based interactions", e.g., one or more voice telephone calls, conference calls, video recordings/streams of an interaction, face-to-face interactions (or recordings thereof), emails, web chats, SMS messages, etc. Interactions may be computer-based if, for example, the interaction has associated metadata items stored or processed on a computer, the interaction is tracked or facilitated by a server, the interaction is recorded on a computer, data is extracted from the interaction, etc. Some computer-based interactions may take place via the internet, such as some emails and web chats, whereas some computer-based interactions may take place via other networks, such as some telephone calls and SMS messages. An interaction may take place using text data, e.g., email, web chat, SMS, etc., or an interaction may not be text-based, e.g., voice telephone calls. Non-text-based interactions may be converted into text-based representations (e.g., using automatic speech recognition). Interaction data may be produced, transferred, received, etc. to a server such as a server of a data center, asynchronously. For example, in a voice call, there may be periods of rapid conversation and other periods with no conversation (e.g., when an agent puts the customer on hold).

As used herein, "real-time" or "real time" may refer to systems or methods with an event to system response time on the order of seconds, milliseconds, or microseconds. It may be preferable that the event to system response time is minimized, e.g., it is in the order of milliseconds or microseconds. In the following description, it is to be understood that systems and methods that are described as real-time embodiments may be embodiments that are suitable for real-time implementation, but which may additionally be suitable for implementation that is not in real time.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. computing devices and servers 201, 220, 230, 260 or 270, observer module 540, and modules in FIGS. 2, 3, 4, 5, 6, 7A and 7B may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 4 according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
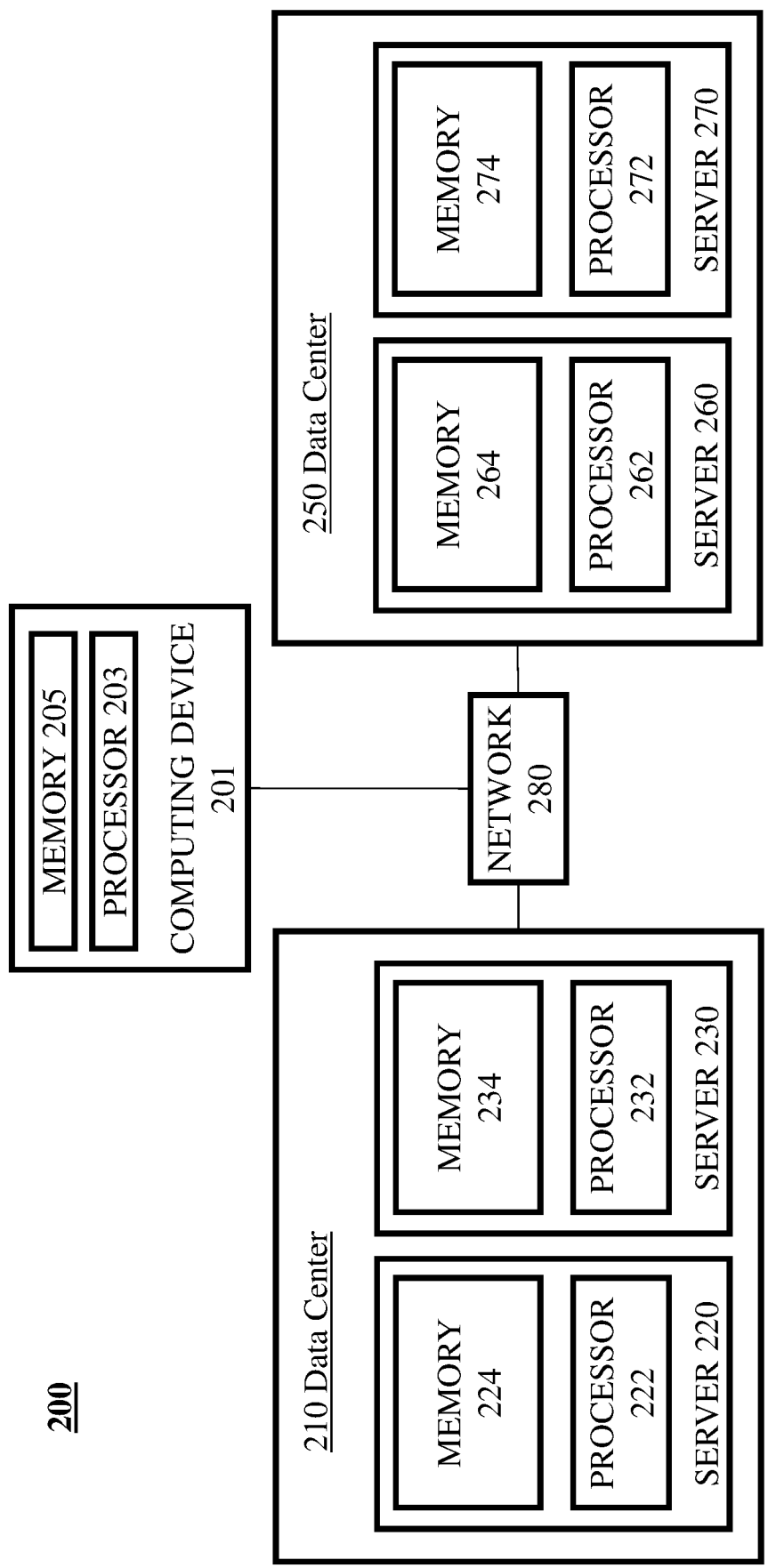
FIG. 2 is a schematic drawing of a system according to some embodiments of the invention.

FIG. 2 is a schematic drawing of a system 200 according to some embodiments of the invention. An embodiment of system 200 may include computing device 201 that may include memory processor 203 and memory 205. Computing device 201 may be connected to a plurality of data centers, e.g. data centers 210 and 250, via a network, e.g. network 280. Each data center may include a plurality of computer devices, e.g. data center 210 may include server computing device 220 and server computing device 230 and data center 250 may include server computing device 260 and server computing device 270. Each server of the plurality of servers, e.g. servers 220, 230, 260 and 270 may include memory and a processor, e.g. memory 224, 234, 264 or 274 and processor 222, 232, 262 or 272. Each data center of a plurality of data centers, e.g. data centers 210 and 250, may be connected with each other, for example via network 280.

Computing device 201 and server computing devices 220, 230, 260 and 270 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 201, 220, 230, 260 and 270 may include one or more input devices, for receiving input from a user (e.g., via a pointing device, click-wheel or mouse, keys, touch screen, recorder/microphone, or other input components). Computers 220, 230, 260 and 270 may include one or more output devices (e.g., a monitor, screen, or speaker) for displaying or conveying data to a user.

Any computing devices of FIGS. 1 and 2 (e.g., 100, 201, 220, 230, 260 and 270), or their constituent parts, may be configured to carry out any of the methods of the present invention. Any computing devices of FIGS. 1 and 2, or their constituent parts, may include an observer module 540, a load balancer module 735, or another engine or module, which may be configured to perform some or all of the methods of the present invention. The systems and methods of the present invention may be incorporated into or form part of a larger platform or a system/ecosystem, such as customer relationship management (CRM) platforms or management platforms. The platform, system, or ecosystem may be run using the computing devices of FIGS. 1 and 2, or their constituent parts. For example, a processor such as processor 203 of computing device 201, processor 222 of device 220, processor 232 of device 230, processor 222 of device 220, processor 262 of device 260, and/or processor 272 of computing device 270 may be configured to identify data transfer capacity and data transfer demand for each server of a plurality of data centers. For example, a processor such as processor 203, 222, 232, 262, and/or 272 may be configured to calculate a data transfer distribution for the plurality of data centers that prioritizes data transfer between servers of a first data center of the plurality of data centers over data transfer between servers of the first data center and servers of the remaining data centers of the plurality of data centers in the calculation of a data transfer distribution. For example, a processor such as processor 203, 222, 232, 262, and/or 272 may be configured to allocate data transfers to the servers of the plurality of data centers. For example, a processor such as processor 203, 222, 232, 262, and/or 272 may be configured to check the availability of the plurality of data centers or of the servers thereof for data transfers.

Figure 3:
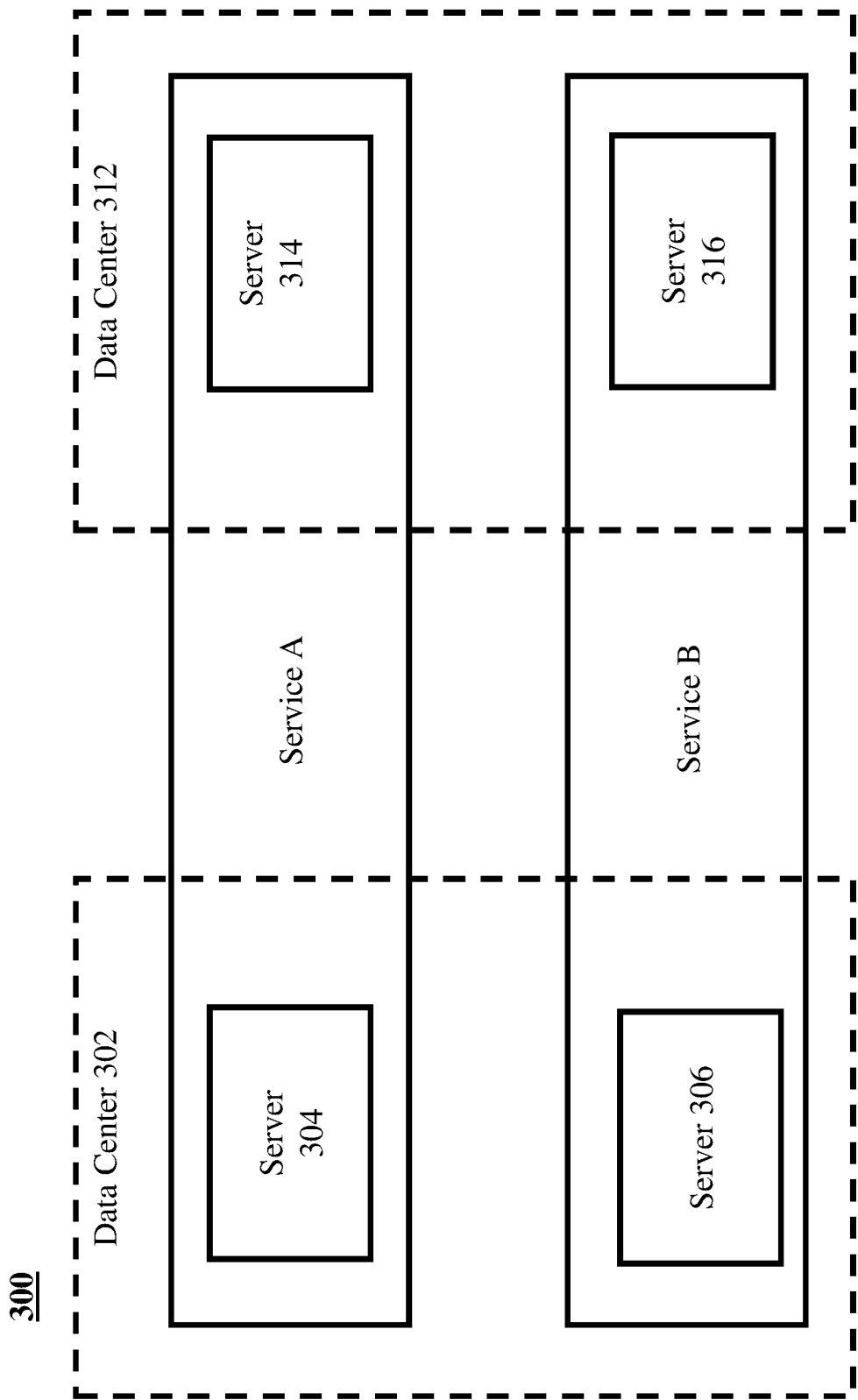
FIG. 3 depicts a dataflow diagram for the transfer of data between two data centers, according to some embodiments of the present invention.

FIG. 3 is a schematic drawing of a system 300, according to some embodiments of the invention, for managing data transfer between a plurality of data centers, for example servers 304 and 306 of data center 302 and for example servers 314 and 316 of data center 312. Data centers, e.g. data centers 302 and 312, may be isolated data centers that are located within a specific region in the world. A data center may be located in a country, in a state or on a specific continent, e.g. Europe. Each data center may have a data transfer capacity. Data transfer capacity of a data center, e.g. data center 302, may be the ability of servers of a data center to handle incoming data transfer demands, e.g. a request of a client to a server to store or to provide data resources, e.g. to store video data of a video call. For example, servers of a data center may provide computing power to execute software applications or to process data that may have been sent to a server, may provide storage, to store data that may be generated by a software application, or may have a specific data transfer rate, e.g. 512 MB per second, in which a server can provide data to a data transfer demand. Accordingly, data centers allow placing computing resources closer to end users, e.g. customers of a cloud service provider.

Software applications, e.g. services A and B may be executed by a plurality of data centers, e.g. data centers 302 and 312. In executing a software application, e.g. service A, service A may require data from a service B that is present on a server of data center 302 but also on a server of data center 312. Server 304 of data center 302 may demand data from server 306 of data center 302 or server 316 of data center 312. On the other hand, server 306 of data center 302 and server 316 of data center 312 may have data transfer capacity to provide data of service B to server 304 of data center 302. Since service B is located on servers 306 and 316 part of data centers 302 and 312, server 304 of data center 302 may retrieve or provide data from either server 306 located within data center 302, in the same data center 302 as server 304, or may retrieve or provide data from server 316 located in data center 312. Since a retrieval or provision of data between server 304 and server 316 would require a data transfer between two different data centers, such a data transfer may lead to the occurrence of costs for routing between different data centers. However, transfer of data between server 304 and server 306 that are located in the same data center 302 may proceed without the occurrence of routing costs.

To avoid costs for data transfer between servers of different data centers, an embodiment of the present invention may provide a solution that assesses the data transfer capacity and data transfer demand of data centers or their servers and may calculate a data transfer distribution for each data center that prioritizes data transfer between servers that are located within a minimum number of between data centers, e.g. servers that are located within a single data center over data transfer between servers that are located within different, e.g. two or more data centers.

In particular data transfer of data that may include media related data, e.g. transferred videos, images or sounds, in interactions that are enabled by contact centers such as video calls or telephone calls may lead to high costs as a result of data transfer between data centers.

In the event that a data center or a server of a data center may be unavailable, e.g. because it may have developed a fault, a data transfer distribution, e.g. data transfer distribution between data centers, may be recalculated. Thereby, data transfer between servers located within a single data center may be prioritized over data transfer between two or more data centers to reduce occurring routing costs that may arise when data is transferred between data centers.

FIG. 4 shows a flowchart of a method 400 for managing data transfers between data centers. The systems displayed in FIGS. 2 and 3 and the method shown in FIG. 4 may refer to the management of data transfers between a plurality of data centers. According to some embodiments, some or all of the steps of the method may be performed (fully or partially) by one or more of the computational components, for example, those shown in FIGS. 1 and 2.

Method 400 for managing data transfers may be executed by a processor of computing device 201, for example processor 203. A data transfer may be a transfer of data between two computing devices, for example server 220 and server 230 or between server 220 and server 260 via network 280. Data transfer may include the transfer of data items, e.g. videos, images or audio files that may be transferred for example during an interaction between a customer and a client in a contact center and that may be stored in memory of server 220.

Figure 5:
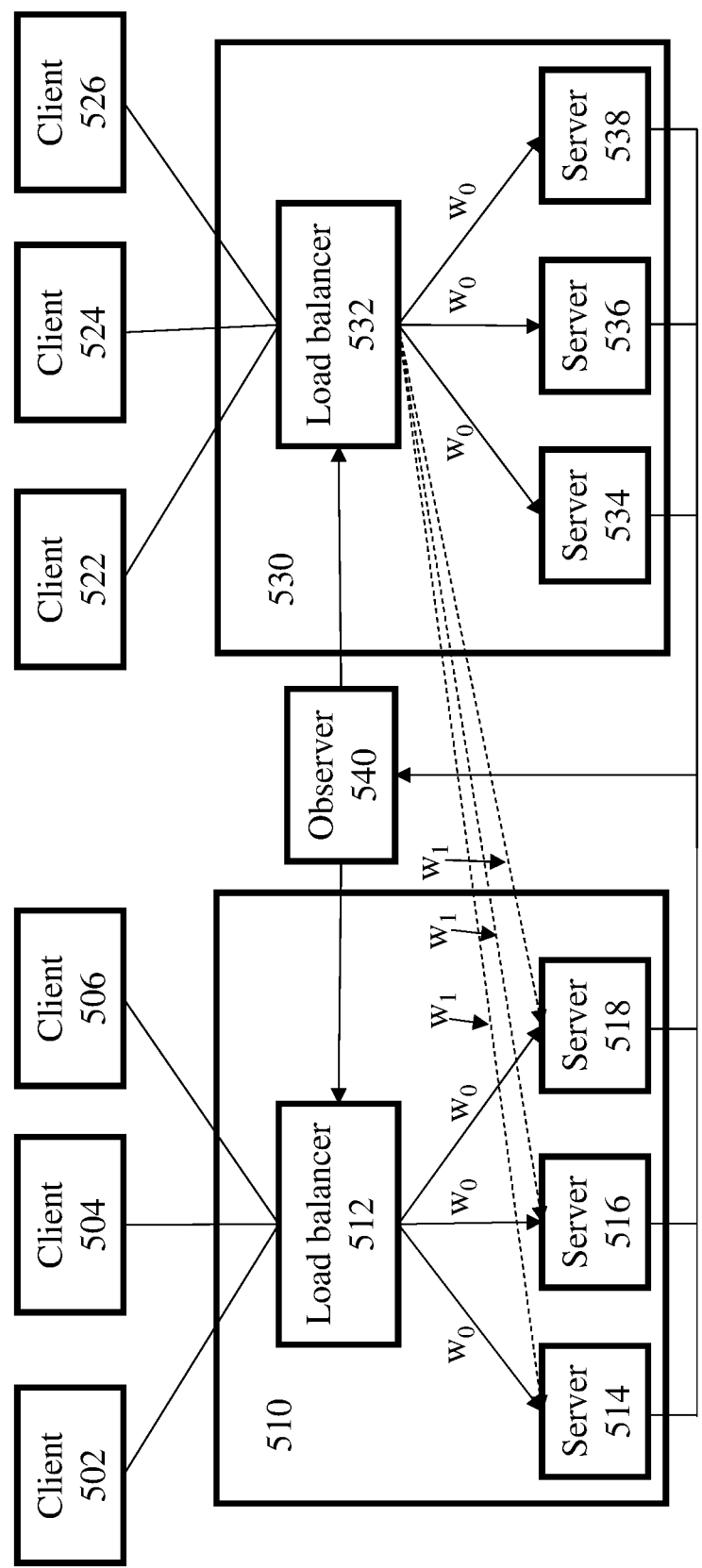
FIG. 5 depicts a dataflow diagram illustrating the distribution of data between data centers, according to some embodiments of the present invention.

In operation 402, data transfer capacity and data transfer demand may be identified for each server of a plurality of data centers (step 402). Data transfer capacity may be the capacity of a server or of a data center to handle data, e.g. to store data in a memory such as memory 224 or to execute a process such as an application via processor 222. Servers of a data center may also be referred to as nodes and, in operation, the capacity and demand for data transfers for each node of two or more data centers may be identified, e.g. by observer module 540. Data transfer demand may be requests that are received at a data center or server of such a data center and may originate from other data centers or a server of a data center to handle data, e.g. to provide data from a memory such as memory 224 or to execute a process such as an application via processor 222. Data transfer capacity for a data center or for servers of a data center may be identified by an observer module, e.g. observer 540 as shown in FIG. 5. Observer module 540 may be executed, for example, by a computing device of FIG. 2 such as computing device 201. Observer module 540 may receive and/or may request information from a plurality of data centers, e.g. data centers 210 and 230, or servers that are connected to a plurality of data that indicate the availability of server to handle data transfers and their capacity to which they can handle data transfers. Servers of a data center may be assigned to a load balancer of a data center, e.g. using a discovery mechanism as it is known in the art, leading to an automatic identification of servers and services within a network such as data centers 210 or 250: For example, a discovery mechanism may be a server-side or a client-side mechanism. In a server-side discovery mechanism, client applications may identify a load balancer of a data center, e.g. data center 210. A client application may attempt an identification of servers or services of a data center, for example, by executing a Hypertext Transfer Protocol (HTTP) request or a Transmission Control Protocol (TCP) connection that may be executed by a client computing device, e.g. client computing devices 502, 504, 506, 522, 524 or 526. In a client-side discovery, client applications may find a service, e.g. an observer module or a load balancer module, by reviewing a service registry of a data center that includes servers and endpoints, e.g. servers 220 and 230. Data transfer demand, e.g. requests for data transfer, submitted to a data center may be identified by a load balancer module, e.g. load balancer modules 512 and 532. Each data center may include a load balancer module. A load balancer module may be a software application that may be carried out by a computing device, e.g. computing device 201. A client may send data, e.g. a data transfer demand or data that is to be transferred and for which a data transfer demand was requested, to a data center, e.g. an availability zone. A load balancer module may receive data transfer demands, e.g. from clients such as computing devices 502, 504, 506, 522, 524 and 526 and may receive data transfer capacity for all servers of each data center via observer module, e.g. observer module 540. An observer module, e.g. observer module 540, may control a load balancer, e.g. it may direct a client to a load balancer of a different data center, in the event that a load balancer of a first data center develops a fault.

An observer module may prompt a load balancer module to calculate a distribution of data transfer for data center or servers of a data center based on the received indications from data centers or their servers. For example, in case a server may be unavailable for data transfer as the server may have developed a fault, observer 540 may recalculate a data transfer distribution without taking into account data transfer capacity of faulty servers.

Some embodiments may include calculating a data transfer distribution for the plurality of data centers that may prioritize data transfer between servers of a first data center of the plurality of data centers over data transfer between servers of the first data center and servers of the remaining data centers of the plurality of data centers (step 404). In an embodiment, data transfers for two or more data centers that prioritize data transfers between nodes of a first data center of the plurality of data centers over data transfers between the nodes of the first data center and nodes of remaining data centers of the plurality of data centers may be determined, e.g. via an observer module such as observer module 540.

Data transfer capacity and data transfer demand for data centers or servers located within data centers may allow determining directions for data transfer. For example, data may be transferred between two servers within a single data center. Alternatively, data may be transferred between different data centers, e.g. from a server of data center A to a server of data center B. Embodiments of calculations of the invention may attempt to prioritize data transfer between servers that belong to the same data center over data transfer between servers that belong to different data centers, e.g. data centers that are located in different regions in the world such as different continents.

In the calculation of a data transfer distribution, a buffer capacity of data transfer capacity may be maintained for each server of a data center. A buffer capacity may be an amount of storage or a percentage of processor power that may be kept available, for example in case data transfer may require a redistribution because a server of a data center may have developed a fault. A buffer capacity of a server can be, for example at least 25% or at least 50% of the data transfer capacity of a server.

Some embodiments may include allocating data transfers to the servers of the plurality of data centers (step 406). Data transfers may be allocated to the servers of the plurality of data centers by an observer module, e.g. observer module 540. An observer module may allocate data transfers to the servers of the plurality of data centers by sending a demand for a data transfer to a load balancer module, e.g. load balancer modules 512 and 532. Based on a calculated data transfer distribution for a plurality of data centers or servers thereof, a load balancer module may send requests for data transfers to servers of data centers. The requests may be assigned to servers of data centers based on the calculated data transfer distribution. A data transfer distribution may be calculated or re-calculated in real-time. Thus, a load balancer may receive input from an observer module, e.g. observer module 540, in real-time and may be provided with information as to whether or not a server is available to provide data transfer capacity for incoming data transfer demands. A load balancer module may recalculate a data transfer distribution and re-allocate data transfers to data centers or servers in response to changes to the availability of servers. For example, in case that data center 1 includes servers A, B and C and server C may develop a fault, an observer module may calculate a data transfer distribution taking into account servers A and B may distribute data transfer for data center 1 for servers A-C to servers A and B if servers A and B are able to handle additional data transfers, e.g. if they can use their buffer capacity. In case that the data transfer capacity for servers of a first data center is lower than the data transfer demand for the servers of the first data center data transfers may be allocated to servers of another data centers. For example, if the data transfer capacity for servers A, B and C of data center 1 is lower than the data transfer demand for servers A, B and C of data center 1, observer module 540 may calculate a distribution of data transfer that allows servers of data center 2 to handle some of the data transfers that were originally indented to be handled by servers A, B and C of data center 1. When data transfer is distributed to data center 2, data may be distributed substantially evenly between servers of data center 2, e.g. servers D, E and F. In this context, "substantially" can be +−5%. In an embodiment, data transfers may be set between nodes of two or more data centers.

Identifying data transfer capacity and the data transfer demand (step 402), calculating the data transfer distribution (step 404) and allocating the data transfers to the plurality of data centers (step 406) may be carried out periodically. For example, the steps may be carried out every second, every minute, every hour or may be adjusted to a customized time period. The steps may be executed independently from each other. For example, the identification of transfer capacity and demand and the calculation of future data transfer distribution may occur at a point in time when a processor handles a previous data transfer request.

Data may be routed free of charge within servers that are located within the same data centers. In the event that a server connected to a data center develops a fault, a routing algorithm, e.g. carried out by observer module 540 may recalculate a new route for a data transfer, e.g. via a second data center.

FIG. 5 shows data centers 510 and 530 that may be linked to an observer module 540. Each of the data centers 510 and 530 may include a load balancer, e.g. load balancers 512 and 532. A load balancer may be available for each data center, e.g. data centers 510 and 530. Clients, for example clients 502, 504, 506, 522, 524 and/or 526 that may be computing devices 100, may send requests for data transfers or for executing a service to load balancers of a data center. For example, clients can be computing devices that execute a recording service, e.g. an application that records interactions between customers and agents of a contact center. Interaction between customers and agents may be phone calls, video calls or text-based interactions.

Clients may send a request for a data transfer, e.g. a request to store a recording of a video call on a server, to a data center that is in geographically close proximity to the client. For example, a client 502 that is based in Asia may send a request for data transfer to a data center, e.g. data center 510 that may be located within Asia.

Load balancer modules 512 and 532 may receive data transfer demand from clients such as clients 502, 504 and 506 for load balancer module 512 and clients 522, 524 and 526 for load balancer module 532 and may distribute data transfer demand to one or more servers within the same data center. For example, load balancer module 512 may distribute data transfer demand to servers 514, 516 and 518 and load balancer 532 may distribute data transfer demand to servers 534, 536 and 538. Servers 514, 516, 518, 534, 536 and 538 may indicate their availability for data transfer to observer module 540. Accordingly observer module 540 can update load balancer modules 512 and 532 based on available servers 514, 516, 518, 534, 536 and 538.

For example, in case server 538 has developed a fault and is no longer available to receive data from load balancer 532. Server 538 may notify observer 540 of its unavailability. As a result, observer module 540 may update load balancer 532 and load balancer 532 may redistribute data to servers 534 and 536 of the same data center 530 or may redistribute data to servers that are part of data center 510.

Each load balancer may be aware of the availability of each server of each data center and may update the distribution of requests for data transfers according to a server's availability to allow data flow inside a data center. In case that a data center cannot handle a request for data transfer, a load balancer e.g. load balancer 532 may send requests for data transfer to servers of another data center, e.g. servers 514, 516 or 518 of data center 510.

Observer module 540 may be a service that may share information on the availability of servers of a data center for data transfer between all data centers and may update load balancers of other data centers according to the availability of servers that are part of other data centers. Observer module 540 may be aware of the corresponding data centers for each server and may receive information on the state of a server or a change to the state of a server. For example, information regarding the state of a server—e.g. whether a server is available or unavailable—may be sent and received in real-time.

In an initial state, when all servers of data centers, e.g. data centers 510 and 530, may be available for managing data transfer, each load balancer of a data center may have a weight constant ($w_0$=const) assigned to all servers of a data center (e.g. also referred to as "local" servers that may be located within the same data center) that may reflect the data transfer capacity of a server. The weight constants for data transfer for all "remote" instances $w_1$ (server capacity provided by remaining data centers, e.g. by data transfer between servers of data center 510 and servers of data center 530) may be set "0"—and data transfer may not occur between data center 510 and data center 530.

When one of the servers, e.g. server 538 develops a fault, its weight constant $w_0$ in the "local" load balancer, e.g. load balancer 532, may be assigned to "0". This will cause load balancer 532 to stop routing traffic to server 538 leading to a reduction in the data transfer capacity of data center 530 for data transfer demand.

In case that servers 534 and 536 of data center 530 cannot handle data transfer demand that was previously assigned to server 538, data transfer demand may be routed to servers of data center 510. Thus, data transfer via remote servers, e.g. between data center 530 and servers 514, 516 and 518 "$w_1$", may be initiated and "$w_1$" may be allocated to a value different to "0".

Embodiments of the invention may include calculating a data transfer distribution that may route data from a data center to a server located in a different data center only when a local server of a data center cannot handle data transfer demand that may have been allocated to a local server. Accordingly, the amount of traffic that may be passed from a first data center of a plurality of data centers to servers of the remaining data centers may be minimized.

Figure 6:
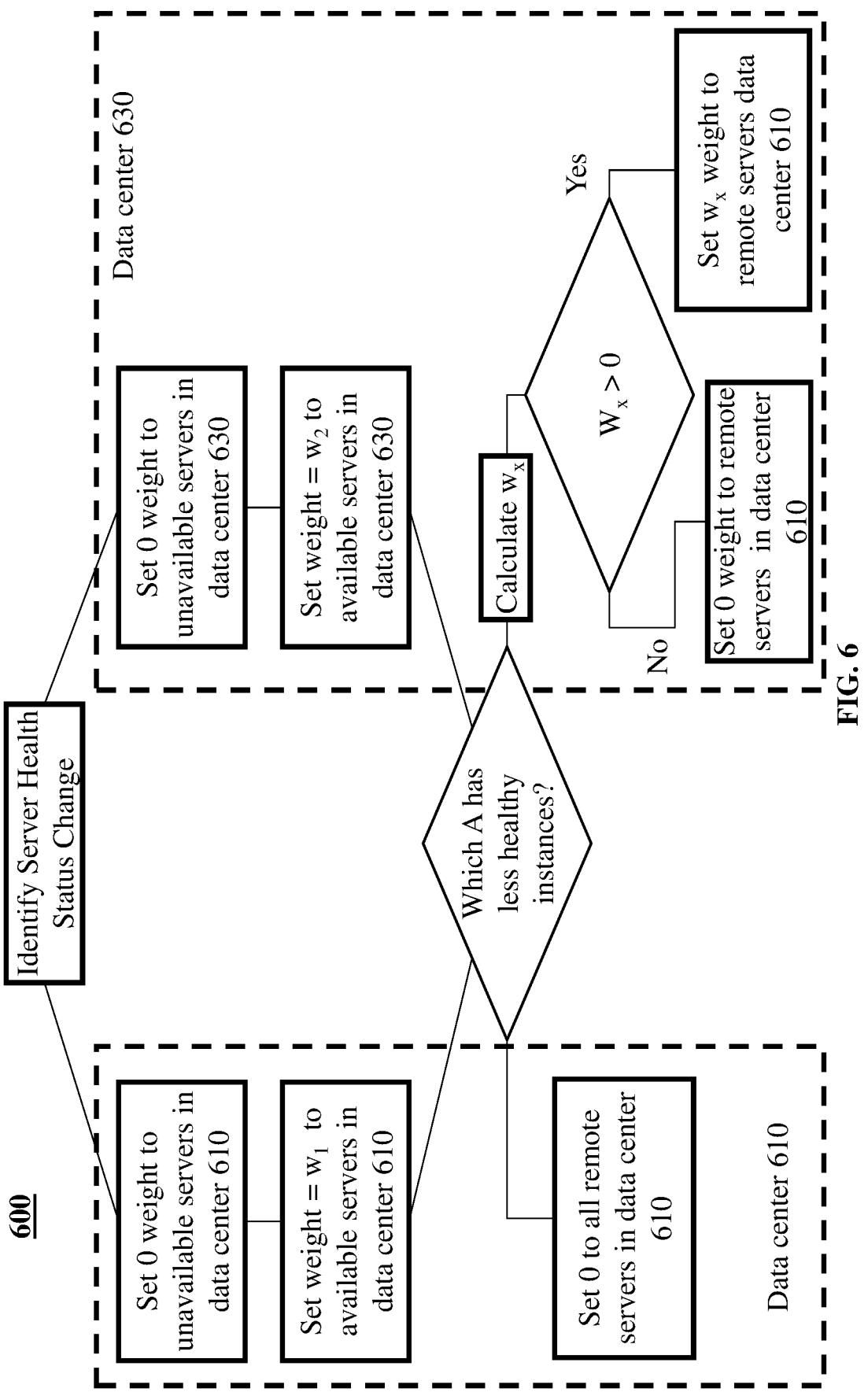
FIG. 6 depicts a scheme for the calculation of a data transfer distribution by an observer module, according to some embodiments of the present invention.

FIG. 6 describes calculation processes that may be carried out by observer module 600. Observer module 600 may be connected to a plurality of data centers, e.g. data centers 610 and 630, and may be invoked each time the availability of one of the servers is modified:

In a first step, an observer module, e.g. observer module 600, may identify the availability of each server of a plurality of data centers for data transfer, e.g. to handle data transfer demands from clients based on their data transfer capacity. For example, an observer module identifies servers that are connected to a data center and may check whether servers are available to participate in data transfer. An observer module may check whether a server can receive data, e.g. from a client that may have requested a data transfer or whether a server can provide data, e.g. from a client that may have requested a data transfer. A server may have a data transfer capacity that indicates how much storage or computational power a server can provide to handle a data transfer demand. For example, three servers of a data center may provide a storage of 100 GB for data transfers. An observer module may review the availability of each server of all data centers for data transfer and may set weight constants for each server of a data center, e.g. data centers 610 and 630. Since all three servers have the same capacity (providing a storage of 100 GB for data transfers), a load balancer may distribute data transfer demands by clients equally between all three servers.

Weight constants for servers of a data center may reflect the partial data transfer capacity of a server of a data centner in relation to the data transfer capacity of all servers of a data center. For example, a data center may include 5 servers and each server has a data transfer capacity of 100 GB, then the partial data transfer capacity for a server may be 20% of the data transfer capacity of all servers of a data center. Servers that may have developed a fault may be assigned a "0" (weight constant=0) and, thus, may be marked as unavailable. Weight constants may be assigned to remaining servers that may be available to receive data. For example, $w_0$ may be set to available servers in data center 610 and $w_0$ may be set to available servers in data center 630. Weight constants may be relative values that indicate the availability of servers in data transfers and/or the relative capability of servers of a data center to handle data transfer demands. In an embodiment, all available servers of a data center may have the same weight constant and, thus, the same capability to handle data transfer demands.

After assignment of weight constants for servers of each of the data center, e.g. data centers 610 and 630, the data center showing the lowest combined weight values for all connected servers may be identified.

A data center that has a higher data transfer capacity (a higher combined weight value for connected servers) than the remaining data centers, may be assigned a 0 for remote servers and, thus, may be restricted in its availability to send data to an servers that may be linked to another data center.

For example, in case servers of data center 610 have a combined value of weight constants $w_0$ that is greater than the combined value of weight constants $w_0$ for servers of data center 630, data center 610 may not be able to send data to any server of data center 630.

Calculation of weight constants for a plurality of data centers, e.g. data centers 610 and 630:

An expected data transfer demand for all servers of a data center may be equal to 1. n may be the total number of servers, e.g. nodes, for a single data center. The terms nodes and servers may be used interchangeably herein. Each data center may be provisioned to handle a load of a where a >1, meaning that server nodes may be provisioned with spare capacity so that each data center can handle failure of some of the servers, e.g. nodes. For example, in a case when nodes may be provisioned to handle unavailability of half of the servers, load a would be equal to 2. Parameters $h_1$, $h_2$ may be a number of available servers in a first data center and a second data center. In the following calculations, it may be assumed that $h_1 < h_2$, meaning that a number of available servers in a first data center may be lower than the number of available servers of the second data center. $w_0$ may be a weight constant of an available local node in a first data center and $w_x$ may be a weight constant that may indicate a data transfer to an available remote node, e.g. from a first data center, e.g. data center 630, to a second data center, e.g. data center 610. $w_x$ may be calculated based on known parameters $w_0$, n, a, $h_1$ and $h_2$ since these are known to an observer module at each given time, e.g. at a point in time when an observer module may reassess the load balance of data centers.

For a first data center 630, the product of the weight constants of an available servers $w_0$, e.g. nodes, multiplied by the number of available servers $h_1$, e.g. nodes, may be equal to the product of data transfer demand a for data center 630 and the number of available servers $h_1$ divided by the total number of servers n for the data center as shown in example formula 1.

$$W_{630} = w_0 h_1 = \frac{ah_1}{n} \quad \text{Formula 1}$$

Data transfer from a first data center, e.g. data center 630, to a second data center, e.g. data center 610 (e.g. a server of a remote data center), may be calculated as the product of the weight constant of an available server $w_x$ multiplied by the number of available servers $h_2$ that may be equal to "1", the expected load of a data center, subtracted by the product of data transfer demand for data center $w_0$ and the number of available servers divided by the total number of servers for the data center as shown in example formula 2.

$$W_{610} = w_x h_2 = 1 - \frac{ah_1}{n} \quad \text{Formula 2}$$

Accordingly, the ratio of $W_{630}$ to $W_{610}$ may be expressed as shown in example formula 3:

$$\frac{W_{610}}{W_{630}} = \frac{h_2 \cdot w_x}{h_1 \cdot w_0} = \frac{1 - \frac{ah_1}{n}}{\frac{ah_1}{n}} = \frac{n - ah_1}{ah_1} \quad \text{Formula 3}$$

Accordingly, weight constant $w_x$ may be calculated in view of parameters $w_0$, $h_1$, $h_2$, n and a as shown in example formula 4. In an embodiment, example formula 4 allows calculating a data transfer distribution for two data centers that prioritizes data transfer between servers of a first data center over data transfer between servers of the first data center and servers of the second data centers based on the identified data transfer capacity and the data transfer demand:

$$w_x = w_0 \cdot \frac{h_1}{h_2} \cdot \frac{n - ah_1}{ah_1} = w_0 \cdot \frac{n - ah_1}{ah_2} \quad \text{Formula 4}$$

Example formula 4 may allow calculating a data transfer distribution for a plurality of data centers, e.g. for servers of two data centers. The calculated value for weight constant $w_x$ may indicate whether a data center 630 can handle data transfer demand using data transfer capacity that is available via its own servers or whether data transfer between servers of a first data center 630 and servers of the remaining data centers of the plurality of data centers, e.g. data center 610 may be required. The calculation of a data transfer distribution via example formula 4 may prioritize data transfer between servers of a first data center, e.g. data center 630 over data transfer between servers of the first data center, e.g. data center 630, and servers of the remaining data centers of the plurality of data centers, e.g. data center 610, since the calculation of the data transfer distribution via example formula 4 initially attempts the distribution of data transfers using data transfer capacity between servers within a single data center, e.g. data center 630, before distributing data transfers to remaining data centers, such as data center 610.

If $w_x > 0$, the data transfer demand for a data center, e.g. data center 630, may be higher than data transfer capacity and data transfers reflected by the weight constant $w_x$ may be assigned to all available remote servers, e.g. servers of data center 610. If $w_x <= 0$, data transfer demand for a data center, e.g. data center 630, may be lower than the data transfer capacity or may meet the data transfer capacity and no data transfers may be assigned to available remote servers. Accordingly, a value of "0" may be assigned to $w_x$ and no data may be transferred to remote servers, e.g. servers of data center 630.

Since an observer module, e.g. observer module 540, or a load balancer module, e.g. load balancer modules 512 and 532, may prioritize data transfer between servers of a first data center, e.g. data center 630, of the plurality of data centers over data transfer between servers of the first data center and servers of the remaining data centers of the plurality of data centers, e.g. remaining data center 610, in the calculation of a data transfer distribution, data transfer between the plurality of data centers is limited. For example, in case that each data center can handle their data transfer demand, data transfer between the plurality of data centers cannot occur.

Following the procedure, a weighted routing policy may be created for each data center. Servers within a data center can run in an unmanaged cluster or as Elastic Container Service (ECS) tasks. An ECS may be an application that manages servers of a data center, e.g. an application that is executed by a server computing device and allows interaction with an observer module of a data center. New servers that may be added to a data center, e.g. data center 610 or 630, may be linked to a load balancer.

An observer module, e.g. module 600, may be a microservice that may be executed periodically, e.g. by computing device 100. For example an observer module may reassess a load balance of a data center every second, every minute, every hour, every day. In each load balance reassessment cycle, observer module 600 may query all registered servers that may be present in one or more data centers.

Then it may perform a health check on each server. For example, for Session-Initiation Protocol (SIP) servers, a SIP options request may be performed to each server. A SIP options request may be used to identify a SIP server's availability to participate in data transfer of a data center. For example, when a SIP server returns a 200Ok response to the request, it may be considered and, thus, available for data transfer. Generally, an availability check for a server may depend on a specifics of an observer module.

Once an observer module may have gained information on all available servers within one or more data centers, an observer module may perform a re-calculation of weight constants according to the algorithm described in FIG. 6. Then, weight constants for all servers of the one or more data centers may be updated.

If an optimal weight constant $w_x$ may have a value of less than zero, all remote servers may be assigned a data transfer demand of 0 ($w_x$=0). Accordingly, when all remote servers may be assigned a data transfer demand of 0, a data transfer distribution may prioritize data transfer between servers of a first data center of the plurality of data centers over data transfer between servers of the first data center and servers of the remaining data centers of the plurality of data centers based on the identified data transfer capacity and the data transfer demand.

In case that there may be unavailable servers in both data centers and there may not enough servers to handle an expected data transfer demand on both data centers, an optimal weight constant calculation can lead to a result that servers in remaining data centers, e.g. a remote data center can receive a data transfer demand than servers in a local data center because of the accumulation of local data transfer demand in a data center in addition to data transfer demand that may be moved from a data center with less available servers. In this case an observer module, e.g. observer module 540 may spread data transfer demand substantially evenly between all servers to achieve an equal distribution between all servers of all data centers. In this context, "substantially" can be +−5%. A substantially even distribution weight between two data centers may be calculated according to example formula 5.

If L is the data transfer demand that may be moved from a first data center to a second data center. In example formula 5, it may be assumed that $h_1 < h_2$, meaning that a number of available servers in a first data center may be lower than the number of available servers of the second data center:

$$\frac{1+L}{h_2} = \frac{1-L}{h_1} \qquad \text{Formula 5}$$

Accordingly, L may calculated via example formula 6:

$$L = \frac{w_x h_2}{w_0 h_1 + w_x h_2} \qquad \text{Formula 6}$$

$w_x$ may be calculated via combination of example formula 5 and example formula 6 to give example formula 7:

$$w_x = w_0 \cdot \frac{h_2 - h_1}{2h_2} \qquad \text{Formula 7}$$

Accordingly, $w_x$ may be assigned a minimum value between an optimal and a minimal spread of weight constants as calculated using example formula 8:

$$w_x = \min\left(w_0 \cdot \frac{n - ah_1}{ah_2}, w_0 \cdot \frac{h_2 - h_1}{2h_2}\right) \qquad \text{Formula 8}$$

Example formulas 5-8 may lead to an even data transfer distribution of data transfer demands between all servers in both data centers. This case may be considered an "optimal" data transfer distribution for two data centers (e.g. data center 610 or 630) in a case in which data centers may not be capable of handling data transfer demands. This case may be observed when a substantially large number of servers (e.g. more than half of the servers of a data center) cannot provide data transfer capacity for data transfer demands. For example, an even data transfer distribution may be used in a case in which data transfer demands that are handled by a remote data center are higher compared to data transfer demands that are handled by local servers of a data center.

For example, each data center of two data centers may be initially connected to four servers and each data center may have a data transfer capacity of 400. Data transfer capacity, as disclosed herein, may be a unitless, relative value to illustrate the distribution to servers and to illustrate the relative changes to the distribution between servers of a plurality of data centers in response to servers that may become available or unavailable for participation in data transfer. Assuming that each server may have buffer capacity and may be able to handle a data transfer demand of 200, parameter a may be equal to 2, and $w_0$ may have a value of 100. Assuming that three servers of data center A may become unavailable, the number of available servers $h_1$ is equal to 1. For a case in which two servers of data center B may become unavailable, the number of available servers $h_2$ may be 2. Accordingly, example formula 4 may lead to a value of 50 for parameter $w_x$. Thus, servers of data center B may be allocated a relative load of data transfers that have a load of 300, which is 200% of the buffer capacity and the remaining server of data center A may be allocated data transfers having a load of 200. To avoid allocating data transfers that significantly exceed the buffer capacity of servers of data center B, data transfer demand for servers of data centers A and B may be substantially evenly distributed between the servers of data centers A and B, since all servers are not capable of handling the entire data transfer demand. Using example formula 7, a substantially even distribution of weight constants may result in a value of 25 and each available server of the available servers may have a data transfer capacity of 266.67.

Example formula 8 may allow evaluating a data transfer distribution that limits data transfer between servers of the first data center and a second data center by prioritizing data transfer between servers of a first data center, and a data transfer distribution that substantially evenly distributes the data transfer demand received by two data centers to available servers of both data centers.

Essentially, in case that data centers are not capable of handling data transfer demand, an observer module may evaluate whether a data transfer distribution should prioritize a data transfer distribution that leads to a reduced data transfer between data centers (leading to reduced costs for the overall data transfers of both data centers) or a data transfer distribution that leads to an equal distribution of data transfer demand (leading to a balanced data transfer distribution and may avoid overloading a server with data transfer demands).

Figure 7A:
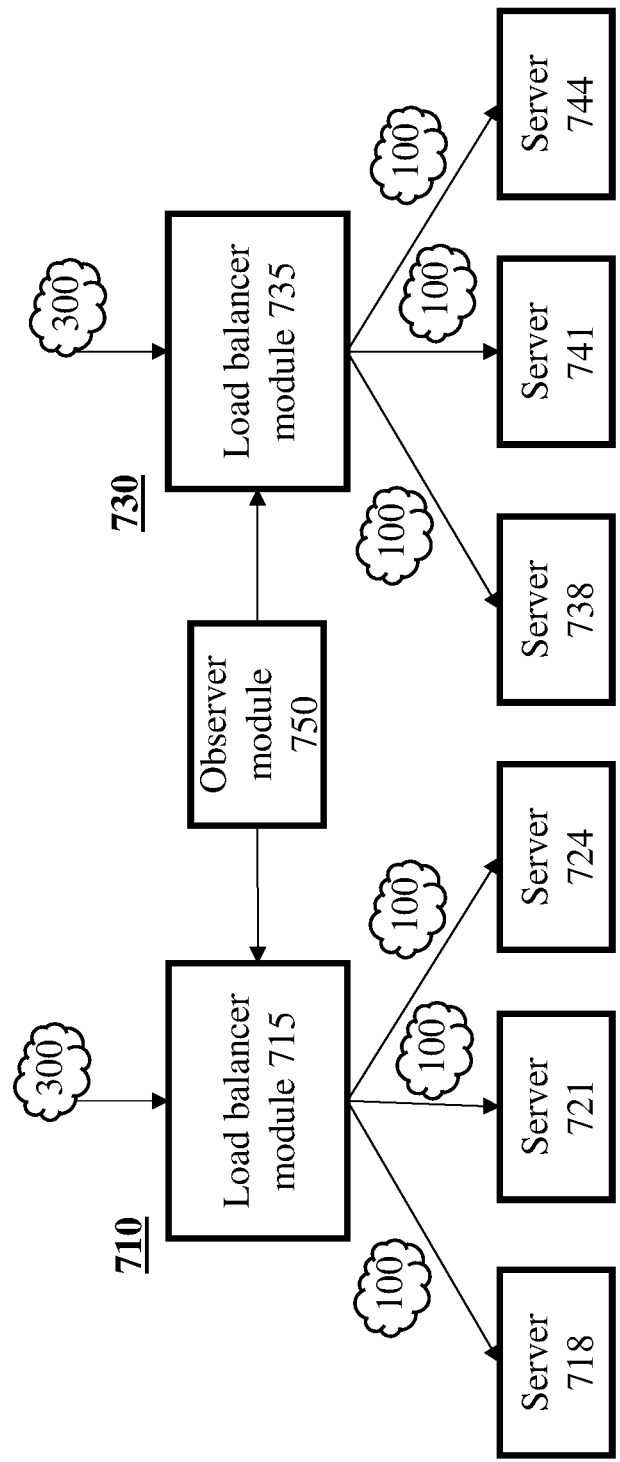
FIG. 7A illustrates an example for calculating a data transfer distribution in response to an occurring server fault at a data center, according to some embodiments of the present invention.

FIG. 7A illustrates an example for calculating a data transfer distribution in response to occurring server faults.

Data centers 710 and 730 may each be connected to three servers (servers 718, 721 and 724 for data center 710 and servers 738, 741 and 744 for data center 730) and both load balancers 715 and 735 may be connected to observer module 750. Observer module 750 may further receive responses from servers 718, 721, 724, 738, 741 and 744 that indicate their availability and data transfer capacity. Both data centers may receive a data transfer demand, e.g. a data load having a value of 300. In case that all servers are available for receiving data from an data center, a data load 300 for each data center may be substantially evenly distributed between all servers of a data center, for example leading to a data load 100 being allocated to each server. Accordingly, data loads are only transferred locally within each of the data centers.

In case an observer module 750 is notified that server 744 connected to data center 730 is unavailable for data transfer, observer 750 may indicate to load balancer module 735 that a data load may be required to be distributed between servers 738 and 741. Example formula 9-based on example formula 4—can be used to calculate whether or not the servers of data center 730 may be able to handle a redistribution of a data transfer demand having a value of 300 (100 for each of server 738, 741 and 744) between servers 738 and 741. Servers 738 and 741 may have a buffer capacity of 50% in relation to the whole data transfer capacity of each server. Accordingly, based on a weight constant of $w_{730}=100$ for data center 730, a distribution of data transfer demand $w_{710}$ to data center 710 may have a value lower than 0. In accordance with the flow chart for observer module 600 outlined in FIG. 6, a data transfer demand value being lower than 0 may indicate that local servers of a data center can handle additional workload, e.g. as a result of a local server becoming unavailable.

$$w_{710} = w_{730} \cdot \frac{n - ah_1}{ah_2} = 100 \cdot \frac{3 - 2 \cdot 2}{2 \cdot 3} < 0 \qquad \text{Formula 9}$$

Accordingly, since the value for $w_{710}$ is lower than 0, data load located at data center 710 may be locally distributed between servers 738 and 741 leading to a data load of 150 per server.

Figure 7B:
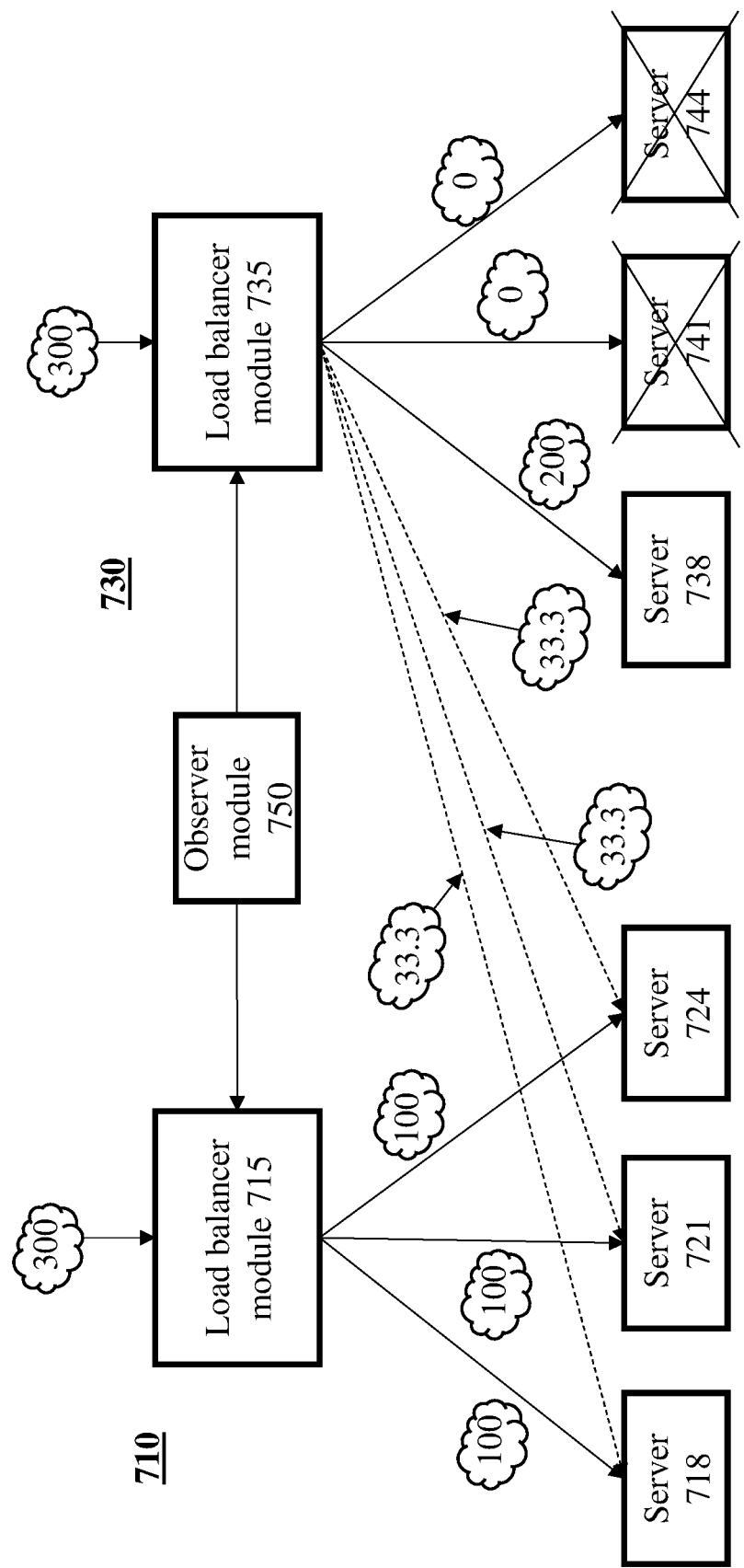
FIG. 7B illustrates an example for calculating a data transfer distribution in response to server faults occurring at multiple servers of a data center, according to some embodiments of the present invention.

FIG. 7B illustrates an example for calculating a data transfer distribution in response to server faults occurring at two servers of data center 730. In case that server 741 and server 744 is unavailable for data loads, observer module 750 may recalculate the distribution $w_{710}$ for data center 710 via example formula 10:

$$w_{710} = w_{730} \cdot \frac{n - ah_1}{ah_2} = 100 \cdot \frac{3 - 2 \cdot 1}{2 \cdot 3} = 16.6 > 0 \qquad \text{Formula 10}$$

In this case, $W_{730}$ is calculated as 16.6>0. Accordingly, server 738 may not be able to handle the entire workload of data center 730. Accordingly, the workload of data center 730 may be distributed globally, e.g. via servers of data center 710.

Observer module 750 may identify three available servers 718, 721 and 724 connected to data center 710. Accordingly, 100 of the workload of data center 730 may be allocated substantially evenly to each of the servers of data center 710 leaving server 738 with a workload of 200. In this context, "substantially" can be +−5%. The workload 100 that may have been allocated to data center 710 may be distributed between servers 718, 721 and 724 and a value of a workload of 33.3 may be allocated to each of server 718, 721 and 724.

In case that server 724 of data center 710 becomes unavailable in addition to servers 741 and 744 of data center 730, data load that may be transferred from data center 730 to servers of data center 710 may be redistributed between available servers 718 and 721 according to example formula 11.

$$w_{710} = w_{730} \cdot \frac{n - ah_1}{ah_2} = 100 \cdot \frac{3 - 2 \cdot 1}{2 \cdot 2} = 25 > 0 \qquad \text{Formula 11}$$

Server 738 may be able to handle a work load of 200. Accordingly, a workload of 100 may be distributed between servers 718 and 721. The workload may be evenly distributed between servers 718 and 721 and each of the servers may receive a workload of 50 from data center 730.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of managing data transfer for a plurality of data centers, the method comprising:
   identifying data transfer capacity and data transfer demand for each server of a plurality of data centers;
   calculating a data transfer distribution for the plurality of data centers that prioritizes data transfer between servers of a first data center of the plurality of data centers over data transfer between servers of the first data center and servers of the remaining data centers of the plurality of data centers based on the identified data transfer capacity and the data transfer demand; and
   allocating data transfers to the servers of the plurality of data centers.

2. A method of managing data transfer according to claim 1, comprising minimizing data transfer between the plurality of data centers.

3. A method of managing data transfer according to claim 1, comprising checking the availability of the plurality of data centers or of the servers thereof for data transfers.

4. A method of managing data transfer according to claim 1, wherein calculating the data transfer distribution comprises maintaining a buffer capacity of data transfer capacity for each server of the plurality of data centers.

5. A method of managing data transfer according to claim 4, wherein the buffer capacity comprises at least 50% of the data transfer capacity for each server.

6. A method of managing data transfer according to claim 1, wherein data transfers are allocated to the servers of the remaining data centers when the data transfer capacity for the servers of the first data center is lower than the data transfer demand for the servers of the first data center.

7. A method of managing data transfer according to claim 6, wherein the data transfers that are allocated to the servers of the remaining data centers are substantially evenly distributed between the servers of the remaining data centers.

8. A method of managing data transfer according to claim 1, wherein the management of the data transfers proceeds in real time.

9. A method of managing data transfer according to claim 1, wherein minimizing data transfer between the plurality of data centers comprises limiting data transfer to data transfer between servers of the first data center and no data transfer between the plurality of data centers.

10. A method of managing data transfer according to claim 1, wherein data transfer capacity comprises one or more of: data storage, data transfer rate and data processing rate of a server.

11. A system for managing data transfer for a plurality of data centers, the system comprising:
- a memory; and
- a processor, the processor configured to:
  - identify data transfer capacity and data transfer demand for each server of a plurality of data centers;
  - calculate a data transfer distribution for the plurality of data centers that prioritizes data transfer between servers of a first data center of the plurality of data centers over data transfer between servers of the first data center and servers of the remaining data centers of the plurality of data centers based on the identified data transfer capacity and the data transfer demand; and
  - allocate data transfers to the servers of the plurality of data centers.

12. A system for managing data transfer according to claim 11, comprising minimizing data transfer between the plurality of data centers.

13. A system for managing data transfer according to claim 11, comprising checking the availability of the plurality of data centers or of the servers thereof for data transfers.

14. A system for managing data transfer according to claim 11, wherein calculating the data transfer distribution comprises maintaining a buffer capacity of data transfer capacity for each server of the plurality of data centers.

15. A system for managing data transfer according to claim 14, wherein the buffer capacity comprises at least 50% of the data transfer capacity for each server.

16. A system for managing data transfer according to claim 11, wherein data transfers are allocated to the servers of the remaining data centers when the data transfer capacity for the servers of the first data center is lower than the data transfer demand for the servers of the first data center.

17. A system for managing data transfer according to claim 16, wherein the data transfers that are allocated to the servers of the remaining data centers are substantially evenly distributed between the servers of the remaining data centers.

18. A system for managing data transfer according to claim 11, wherein the management of the data transfers proceeds in real time.

19. A system for managing data transfer according to claim 11, wherein minimizing data transfer between the plurality of data centers comprises limiting data transfer to data transfer between servers of the first data center and no data transfer between the plurality of data centers.

20. A method of managing the distribution of data for a plurality of data centers, the method comprising:
- identifying capacity and demand for data transfers for each node of two or more data centers;
- determining an allocation of data transfers for the two or more data centers that prioritizes data transfers between nodes of a first data center of the two or more data centers over data transfers between the nodes of the first data center and nodes of remaining data centers of the two or more data centers based on the identified capacity and demand for data transfers; and
- setting data transfers to the nodes of the two or more data centers.

* * * * *